Sept. 6, 1949.  L. M. SEELY  2,481,162
CHEESE CUTTING MACHINE
Filed Feb. 6, 1948  3 Sheets-Sheet 1

Inventor
Llewellyn M. Seely
By Joseph Rossman
Atty.

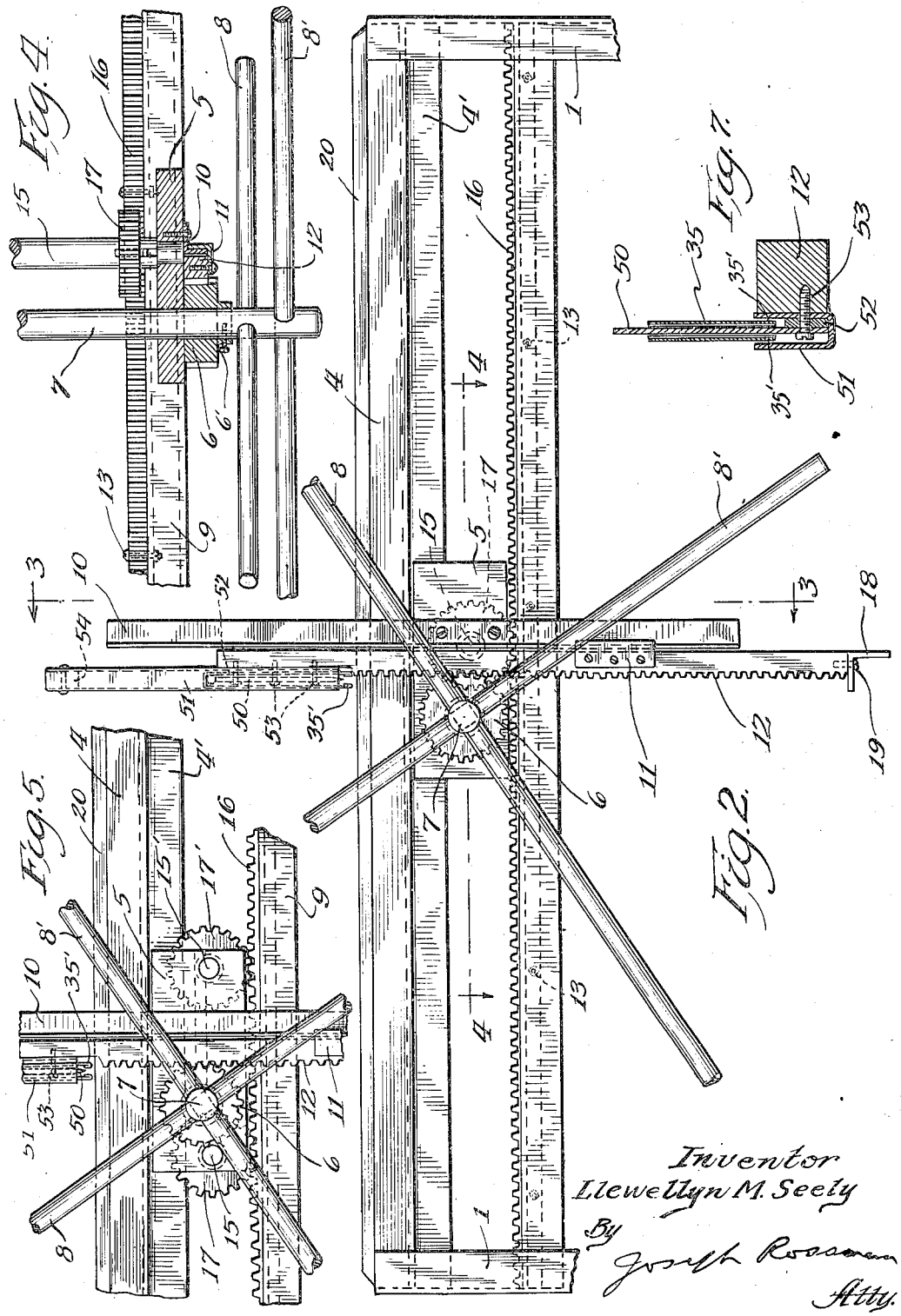

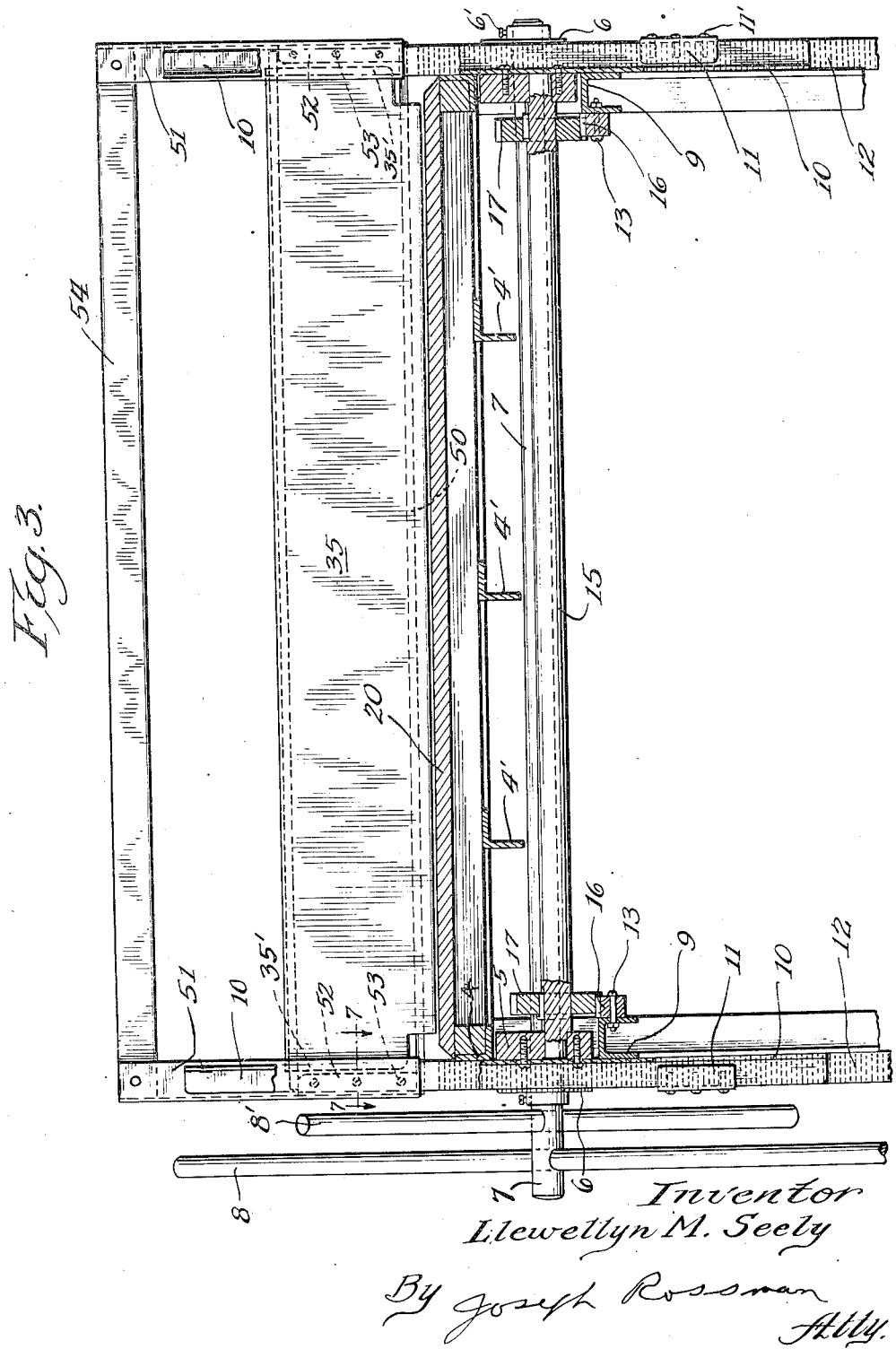

Patented Sept. 6, 1949

2,481,162

UNITED STATES PATENT OFFICE 2,481,162

CHEESE CUTTING MACHINE

Llewellyn M. Seely, Cheltenham Township, Montgomery County, Pa.

Application February 6, 1948, Serial No. 6,636

3 Claims. (Cl. 31—30)

This invention relates to an improved machine for cutting large blocks of cheese, such as Swiss cheese, into smaller blocks that may be conveniently handled by the retailer for slicing into smaller quantities as required by ultimate consumers. The cheese-cutting machine constructed according to the present invention is easy to operate, it will not get out of order or jam in use and requires no servicing or repairs over long periods of use.

The present construction consists essentially of a table top of relatively large area which supports the block of cheese, a cutting blade which can be moved horizontally to any desired position by a gear and rack construction over the cheese and means for moving the cutting blade upwardly and downwardly to cut the cheese. A novel self-positioning guard is provided for the cutting blade to protect the operator against accidental injury by the cutting blade.

Figure 1:
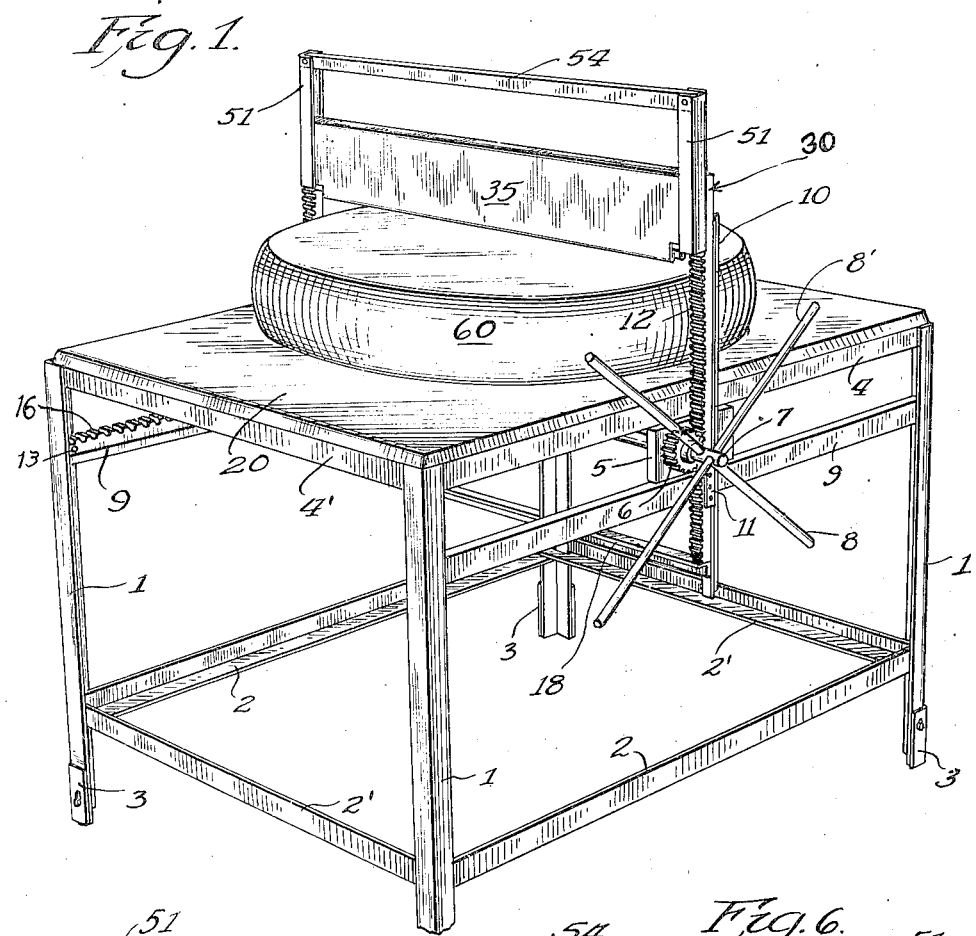
Figure 6:
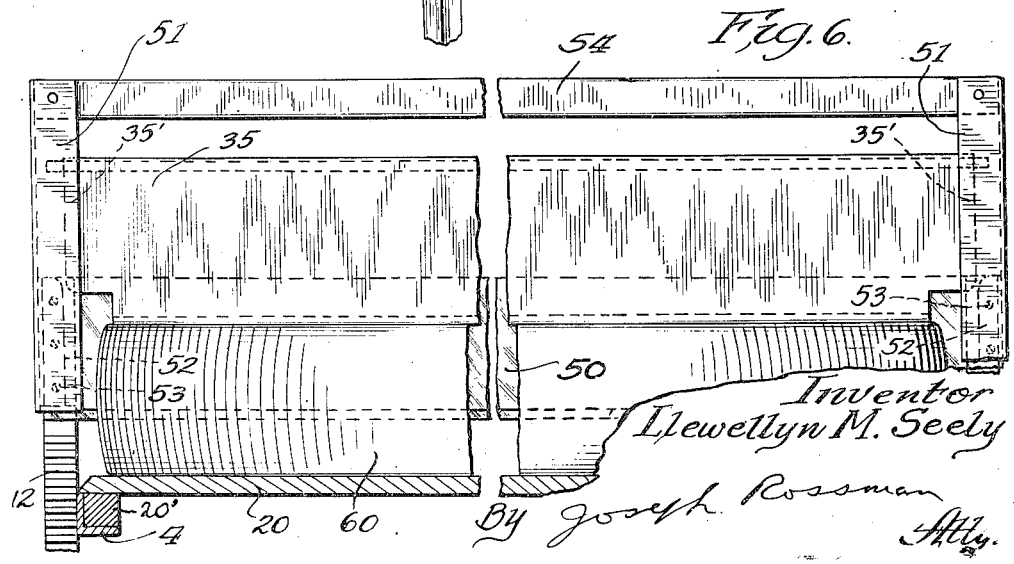

Further details and advantages of the invention will be apparent from the following specification and drawings, wherein Figure 1 is a perspective view of the cheese-cutting machine construction according to the present invention, Figure 2 is a side view of the machine, Figure 3 is a sectional view taken on lines 3—3 of Figure 2, Figure 4 is a sectional view taken on lines 4—4 of Figure 2, Figure 5 is a fragmental side view of a modified construction of the knife carriage construction, Figure 6 is a fragmental end view of the machine shown in Figure 1, and Figure 7 is a sectional view taken on lines 7—7 of Figure 3.

Referring to the drawings, a table top 20 is provided, preferably made of a single die block such as of Bakelite, laminated sheets adhesively bonded by a synthetic resin, redwood and the like of sufficient dimensions to support a large commercial size disc of say Swiss cheese 60. The table 20 is supported on a frame member made of four spaced vertical angle iron leg members 1, lower horizontal cross members 2 and 2' and upper horizontal cross members 4 and 4' welded together at their abutting ends in the relation shown in Figure 1. A plurality of spaced reinforcing upper horizontal channel members 4' are provided, as shown in Figure 3, extending from one end of the frame to the other and preferably welded at their ends to upper angle irons 4. The table top 20 is firmly supported in the upper angle members as shown in Figures 3 and 6 by means of block members 20' which may be integral with the table top 20' or attached thereto in any suitable manner or the table top may rest directly in the angle members. Adjustable brackets 3 are provided at the bottom of each leg member 1 to permit levelling of the table on any given floor where the machine may be located and provide for adjustment of the legs so that the table top may be adjusted to different heights.

Two opposed channel members 9 are provided beneath the table top for supporting a drive mechanism for a movable carriage indicated generally by numeral 30. The carriage 30 is adapted to be moved horizontally on spaced gear racks 16 fixed to the channel members 9 by bolts 13 or other suitable means. A pair of freely rotatable opposed gears 17 on carriage 30 mesh with the racks 16 so that the carriage can be manually pushed from one end of the table to the other end as desired. The carriage is comprised of two block members which support two spaced vertical angle members 10 as shown in Figures 2 and 4. A shaft 15 is supported at each end in the spaced blocks 5. Gears 17 are positioned adjacent each end of the shaft 15 and are fixed thereon. The gears 17 as previously stated are adapted to mesh with the teeth on racks 16 and to rotate thereon so as to move the carriage 13 along the length of the table.

Guide brackets 11 are bolted to vertical gear racks 12. The guide brackets are adapted to mate with the channel member 10 in sliding engagement, as shown in Figure 4. The vertical racks 12 are thus guided for sliding vertical movement on the carriage 30. A rotatable shaft 7 is supported at the ends thereof in the spaced blocks 5. A gear 6 is fixedly mounted at each end of the shaft 7 by pins 6'. The gears mate with the teeth on vertical racks 12. Handle bars 8 and 8' are provided on one end of shaft 7 to permit manual rotation of the shaft 7. When shaft 7 is rotated the gears 6 which are engaged with the racks 12 will move the racks 12 up or down depending upon the direction of rotation of the handle bars. The bottom ends of the racks are connected by a cross-angle 18 by bolts 19 which serve to act as a stop member for limiting the upward travel of the vertical racks.

A cutting blade 50 is bolted to the upper portions of the vertical racks by bolts 53.

A self-adjusting guard member 35 is provided on the cutting blade 50 for protecting the operator against possible injury from the cutting blade. The guard member is preferably made of sheet metal bent into U-shaped form so as to embrace the cutting blade 50 in freely slideable relation thereto. The opposed lateral sides 35' of the guard member are adapted to slide in U-shaped guide members 51 which are affixed to the upper portion of vertical racks 12 by the bolts 53 which also serve to retain the cutting blade 50. As shown in Figure 7, a spacer element 52 is positioned on the inner face of one leg of the U-shaped guide member 51 so as to offset or space the cutting blade 50 away from the rack member 12. This construction provides a guide way on each of the lateral sides of the cutting blade in which the marginal portions 35' of the guard can slide freely. An upper cross-member 54 connects the upper ends of the spaced guide members 51.

This construction of the guard member permits the guard to slide up or down over the cutting blade. The guard always tends to slide to its lowermost position due to the action of gravity. The height of the guard is greater than that of the cutting blade 50 so that its lower edges 35' will extend below the cutting edge of the cutting blade. Thus the cutting edge of the cutting blade is always shielded and will thus protect the hands of the operator at any position in which the knife may be above the table when the knife is not in use. When an article such as cheese 60 is being cut, as shown in Figure 6, the guard will automatically slide upwardly along the guides 51 as previously explained without interfering with the cutting operation.

The lower edges 35' of the guard member 35 are preferably turned inwardly, as shown in Figure 5, to reinforce the lower edges as well as to prevent the edges from becoming embedded in the article being cut.

In using the described cheese-cutting machine, a block of cheese 60 is placed on the table, as shown in Figure 1. The operator then manually pushes the carriage by grasping the handle bars 8 and 8' to any suitable position over the block of cheese. The carriage will readily slide on racks 16 as the gears readily rotate thereon and will remain at the desired position, since the teeth of the gears 17 and racks 16 are in meshing relation. The operator then turns the handles 8 and 8' so as to lower the cutting blade to the top of the block of cheese, as shown in Figure 1. Further rotation of the handles will cause the gears 6 meshing with vertical racks 12 to force the cutting blade through the cheese, as shown in Figure 6. At the same time the guard 35 will slide upwardly resting on the surface of the cheese. When the cheese is cut through completely the knife is elevated by turning the handles 8 and 8' in the opposite direction. The carriage is then moved horizontally to another desired position and the knife lowered again as previously explained to cut the cheese again. This operation is repeated as often as desired.

In previous constructions using blocks slideable in frictional relation on run ways, as in U.S. Patent 2,017,642, October 15, 1935, it was found very difficult to move the carriage since the blocks jammed in the run ways, especially since each block operated independently of the other. Also very often dirt and foreign substances would get in the run ways and cause sticking of the blocks. In my construction both gears 17 being fixed on a single shaft will rotate at the same time and thus avoid jamming of the carriage. Furthermore, the teeth of the gears 17 and racks 16 assure positive movement of the carriage as well as retention at any given point when cutting is performed.

Figure 5 illustrates a modified construction of the gear mechanism for moving the carriage horizontally. Instead of using a single shaft 15 and gears 17, as shown in Figure 4, it may be desirable to use a pair of spaced shafts 15 and 15' each of which carries gears 17 and 17' respectively for engagement with racks 16. This construction serves to balance the tilting forces acting on the carriage during the cutting operation, but otherwise the construction of the cutting machine is similar to the first construction described.

Various changes and modifications may be made in my construction which are intended to be included within the spirit of the invention as defined in the appended claims.

I claim:

1. In a cutting machine comprising a vertically movable cutting blade, a slideable guard member embracing said cutting blade and having free vertically extending marginal portions, vertical guides adjacent the sides of said cutting blade, the marginal portions of said guard member being slideable in said vertical guides, said guard member being normally actuated by gravity downwardly and freely slideable to rest in its lowermost position and having its lower edge extending below the cutting edge of said cutting blade.

2. In a cutting machine comprising a vertically movable cutting blade, a U-shaped slideable guard member embracing said cutting blade, and having free vertically extending marginal portions, the height of said guard member being greater than said cutting blade, vertical guides adjacent the sides of said cutting blade, the extending marginal portions of said guard member being slideable in said vertical guides, said guard member being normally actuated by gravity downwardly and freely slideable to rest in its lowermost position and having its lower edge extending below the cutting edge of said cutting blade.

3. In a cutting machine comprising a vertically movable cutting blade, a U-shaped slideable guard member enclosing both faces of said cutting blade and having free vertically extending marginal portions, vertical guides adjacent the lateral sides of said cutting blade, the extending marginal portions of said guard member being slideable in said vertical guides, said guard member being normally actuated by gravity downwardly and freely slideable to rest in its lowermost position and having its lower edge extending below the cutting edge of said cutting blade.

LLEWELLYN M. SEELY.

REFERENCES CITED

The following references are of record in the file of this patent:

UNITED STATES PATENTS

| Number | Name | Date |
|---|---|---|
| 456,380 | Kidder | July 21, 1891 |
| 1,106,920 | Brock | Aug. 11, 1914 |
| 1,121,046 | Schlesinger | Dec. 15, 1914 |
| 1,826,222 | Peterson | Oct. 6, 1931 |
| 2,017,642 | Wines | Oct. 15, 1935 |